US012518004B2

(12) United States Patent
Iles et al.

(10) Patent No.: US 12,518,004 B2
(45) Date of Patent: Jan. 6, 2026

(54) MITIGATING POINTER AUTHENTICATION CODE (PAC) ATTACKS IN PROCESSOR-BASED DEVICES

(71) Applicant: QUALCOMM Incorporated, San Diego, CA (US)

(72) Inventors: Jamie David Iles, Queen Charlton (GB); Conrado Blasco, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/067,825

(22) Filed: Dec. 19, 2022

(65) Prior Publication Data

US 2024/0086526 A1    Mar. 14, 2024

Related U.S. Application Data

(60) Provisional application No. 63/375,331, filed on Sep. 12, 2022.

(51) Int. Cl.
*G06F 21/55* (2013.01)
*G06F 21/54* (2013.01)
*G06F 21/56* (2013.01)

(52) U.S. Cl.
CPC ............ *G06F 21/554* (2013.01); *G06F 21/54* (2013.01); *G06F 21/566* (2013.01)

(58) Field of Classification Search
CPC ....... G06F 21/554; G06F 21/54; G06F 21/566
See application file for complete search history.

(56) References Cited

U.S. PATENT DOCUMENTS

| 6,282,636 | B1* | 8/2001 | Yeh ........................ G06F 9/3861 |
| | | | 712/E9.06 |
| 6,438,673 | B1* | 8/2002 | Jourdan .............. G06F 12/0862 |
| | | | 712/240 |
| 10,275,365 | B1* | 4/2019 | Gonion ................. H04L 9/0618 |
| 10,354,094 | B2* | 7/2019 | Alon .................... G06F 12/0802 |
| 11,030,344 | B2* | 6/2021 | Barnes .................. G06F 21/125 |

(Continued)

OTHER PUBLICATIONS

Liljestrand H., et al., "PAC it up: Towards Pointer Integrity using ARM Pointer Authentication", SEC'19: Proceedings of the 28th USENIX Conference on Security Symposium, Aug. 2019, 18 Pages.

(Continued)

*Primary Examiner* — Linglan Edwards
*Assistant Examiner* — Kamryn J Gillespie
(74) *Attorney, Agent, or Firm* — W&T

(57) ABSTRACT

Mitigating Pointer Authentication Code (PAC) attacks in processor-based devices is disclosed herein. In this regard, in some exemplary aspects, a processor of a processor-based device is configured to determine that a pointer authentication instruction to authenticate a pointer is being executed speculatively. The processor is further configured to, responsive to determining that the pointer authentication instruction is being executed speculatively, determine, based on a signature of the pointer, that the pointer is not valid. The processor is also configured to, responsive to determining that the pointer is not valid, perform a mitigation action.

29 Claims, 8 Drawing Sheets

(56) References Cited

U.S. PATENT DOCUMENTS

| | | | |
|---|---|---|---|
| 2007/0061555 A1* | 3/2007 | St. Clair | G06F 9/30054 |
| | | | 712/E9.083 |
| 2019/0042799 A1* | 2/2019 | Durham | G06F 21/64 |
| 2020/0134234 A1 | 4/2020 | LeMay et al. | |
| 2022/0027452 A1 | 1/2022 | Semeria et al. | |
| 2022/0027467 A1* | 1/2022 | Favor | G06F 9/30189 |
| 2022/0067155 A1 | 3/2022 | Favor et al. | |
| 2023/0088081 A1* | 3/2023 | Lin | G06F 21/52 |
| | | | 726/23 |
| 2024/0241951 A1 | 7/2024 | Iles et al. | |

OTHER PUBLICATIONS

Ravichandran J., et al., "PACMAN: Attacking ARM Pointer Authentication with Speculative Execution", ISCA 22, Jun. 18-22, 2022, New York, NY, USA, 2022, 14 Pages.

Ziad M.T.I., et al., "ZeRØ: Zero-Overhead Resilient Operation under Pointer Integrity Attacks", 2021 ACM/IEEE 48th Annual International Symposium on Computer Architecture (ISCA), Jun. 14-18, 2021, pp. 1-14.

International Search Report and Written Opinion for International Patent Application No. PCT/US2023/072439, mailed Dec. 7, 2023, 12 pages.

Mujumdar A., et al., "ARM v8.1-m Pointer Authentication and Branch Target Identification Extension," Arm Community, Apr. 7, 2021, 24 Pages, XP093063386, p. 4.

* cited by examiner

MITIGATING POINTER AUTHENTICATION CODE (PAC) ATTACKS IN PROCESSOR-BASED DEVICES

PRIORITY CLAIM

The present application claims priority to U.S. Provisional Patent Application Ser. No. 63/375,331, filed on Sep. 12, 2022 and entitled "MITIGATING PACMAN ATTACKS IN PROCESSOR-BASED DEVICES," the contents of which is incorporated herein by reference in its entirety.

BACKGROUND

I. Field of the Disclosure

The technology of the disclosure relates generally to pointer authentication in processor-based devices, and, in particular, to mitigating the possibility of attacks based on repeated attempted authorizations of pointer signatures during speculative execution.

II. Background

Memory corruption vulnerabilities represent one long-standing security issue affecting modern processor-based devices. Memory corruption vulnerabilities may include memory corruption bugs (e.g., out-of-bound writes and reads, use-after-free and double-free bugs, and integer overflows and underflows), as well as memory corruption attacks that exploit such bugs. Of particular concern are memory corruption attacks known as "control-flow hijacking attacks" that modify code pointers stored in memory to alter the program flow of an executing process. An attacker using a control-flow hijacking attack could change a code pointer used by an executing process to redirect execution of the process and cause potentially harmful code supplied by the attacker to be executed.

To protect the integrity of pointers and defend against control-flow hijacking attacks, some modern processor-based devices implement instruction set architectures (ISAs) that include pointer signing instructions and pointer authentication instructions. Using such instructions and related underlying hardware, a process can sign a pointer using a cryptographic hash called a Pointer Authentication Code (PAC), which is generated using the pointer and stored within unused bits of the pointer. The PAC can then be later used as a signature of the pointer to verify that the pointer has not been improperly modified, and to raise a software-visible architectural exception if the pointer has been tampered with. In this manner, the difficulty faced by an attacker in performing an unauthorized modification of a pointer can be significantly increased.

However, researchers recently proposed a type of attack, referred to herein as a PAC attack and also referred to as a "PACMAN attack," that could enable an attacker to brute-force a pointer's signature using a technique that can avoid the raising of architectural exceptions. To accomplish this, a PAC attack employs a speculative execution path to attempt to verify a pointer signature, and uses microarchitectural side channels (e.g., changes made to contents of caches, translation lookaside buffers (TLBs), functional units, and network-on-chips that remain even if a speculative execution path is squashed) to leak the results of the attempted signature verification. In this manner, an attacker using a PAC attack theoretically could perform a successful control-flow hijacking attack even on a processor-based device whose ISA provides pointer signing instructions and pointer authentication instructions.

SUMMARY OF THE DISCLOSURE

Aspects disclosed in the detailed description include mitigating Pointer Authentication Code (PAC) attacks in processor-based devices. Related apparatus, methods, and computer-readable media are also disclosed. In this regard, in some exemplary aspects disclosed herein, a processor of a processor-based device (e.g., using a mitigation circuit) determines that a pointer authentication instruction to authenticate a pointer is being executed speculatively. Upon speculatively executing the pointer authentication instruction and determining that the pointer is not valid, the processor performs a mitigation action. As used herein, a "pointer authentication instruction" refers to explicit authentication instructions, such as the ARM instruction AUT, and/or to instructions that comprise a combination of an authentication micro-operation and another micro-operation such as a load micro-operation or a branch micro-operation, as non-limiting examples. The term "PAC attack" and "PACMAN attack" are used herein to refer to attempts to use speculative execution of a pointer authentication instruction to attempt to verify a pointer signature and subsequently use microarchitectural side channels to leak the results of the attempted signature verification.

In some exemplary aspects, the mitigation action includes modifying the signature of the pointer to indicate that the pointer is valid (even though the pointer is in fact not valid), and also raising a microarchitectural exception to trigger a pipeline flush. This process would prevent any information regarding the true validity of the pointer from causing microarchitectural side-effects that could be detected by an attacker. According to some aspects, the pipeline flush may be triggered immediately, while some aspects may provide that the pipeline flush is triggered when the pointer authentication instruction is ready for retirement. In some aspects, the pipeline flush may flush only instructions younger than the pointer authentication instruction, in which case the processor would provide a mechanism for re-executing the pointer authentication instruction to obtain the true result regarding the validity of the pointer. Some aspects may provide that the pointer authentication instruction itself is also flushed. In such aspects, an indicator associated with the pointer authentication instruction is set so that the processor can determine when a subsequent iteration of the pointer authentication instruction is no longer speculative. When the subsequent iteration of the pointer authentication instruction is determined to no longer be speculative, the processor performs pointer authentication in conventional fashion by modifying the signature of the pointer to trigger an invalid address architectural exception if the signature of the pointer indicates that the pointer is not valid. In this manner, such aspects can degrade the effectiveness of an attempted PAC attack by prevent leaks regarding the true validity of the pointer via microarchitectural side channels (i.e., by not flagging the pointer as valid, which causes an attacker's brute-force guesses as to the pointer signature to always return the same result whether the guess is correct or incorrect).

According to some aspects, the mitigation action performed by the processor may comprise modifying the signature of the pointer to indicate that the pointer is not valid, and incrementing a value of an invalid pointer counter. The processor in such aspects may then determine whether the value of the invalid pointer counter exceeds an invalid pointer count threshold. If so, the processor raises an architectural exception to indicate a possible attack. Such aspects thus provide protection against brute-force PAC attacks, which generally require a large number of pointer authentication instruction speculative executions before a PAC can be correctly guessed.

In another aspect, a processor-based device is provided. The processor-based device comprises a processor that comprises an execution pipeline circuit. The processor is configured to determine that a pointer authentication instruction to authenticate a pointer is being executed speculatively. The processor is further configured to, responsive to determining that the pointer authentication instruction is being executed speculatively, determine, based on a signature of the pointer, that the pointer is not valid. The processor is also configured to, responsive to determining that the pointer is not valid, perform a mitigation action.

In another aspect, a processor-based device is provided. The processor-based device comprises means for determining that a pointer authentication instruction to authenticate a pointer is being executed speculatively. The processor-based device further comprises means for determining, based on a signature of the pointer, that the pointer is not valid, responsive to determining that the pointer authentication instruction is being executed speculatively. The processor-based device also comprises means for performing a mitigation action, responsive to determining that the pointer is not valid.

In another aspect, a method for mitigating PAC attacks is provided. The method comprises determining, by a processor of a processor-based device, that a pointer authentication instruction to authenticate a pointer is being executed speculatively. The method further comprises, responsive to determining that the pointer authentication instruction is being executed speculatively, determining, based on a signature of the pointer, that the pointer is not valid. The method also comprises, responsive to determining that the pointer is not valid, performing a mitigation action.

In another exemplary embodiment, a non-transitory computer-readable medium having stored thereon computer-executable instructions is provided. The computer-executable instructions, when executed by a processor, cause the processor to determine that a pointer authentication instruction to authenticate a pointer is being executed speculatively. The computer-executable instructions further cause the processor to, responsive to determining that the pointer authentication instruction is being executed speculatively, determine, based on a signature of the pointer, that the pointer is not valid. The computer-executable instructions also cause the processor to, responsive to determining that the pointer is not valid, perform a mitigation action.

DETAILED DESCRIPTION

Figure 1:
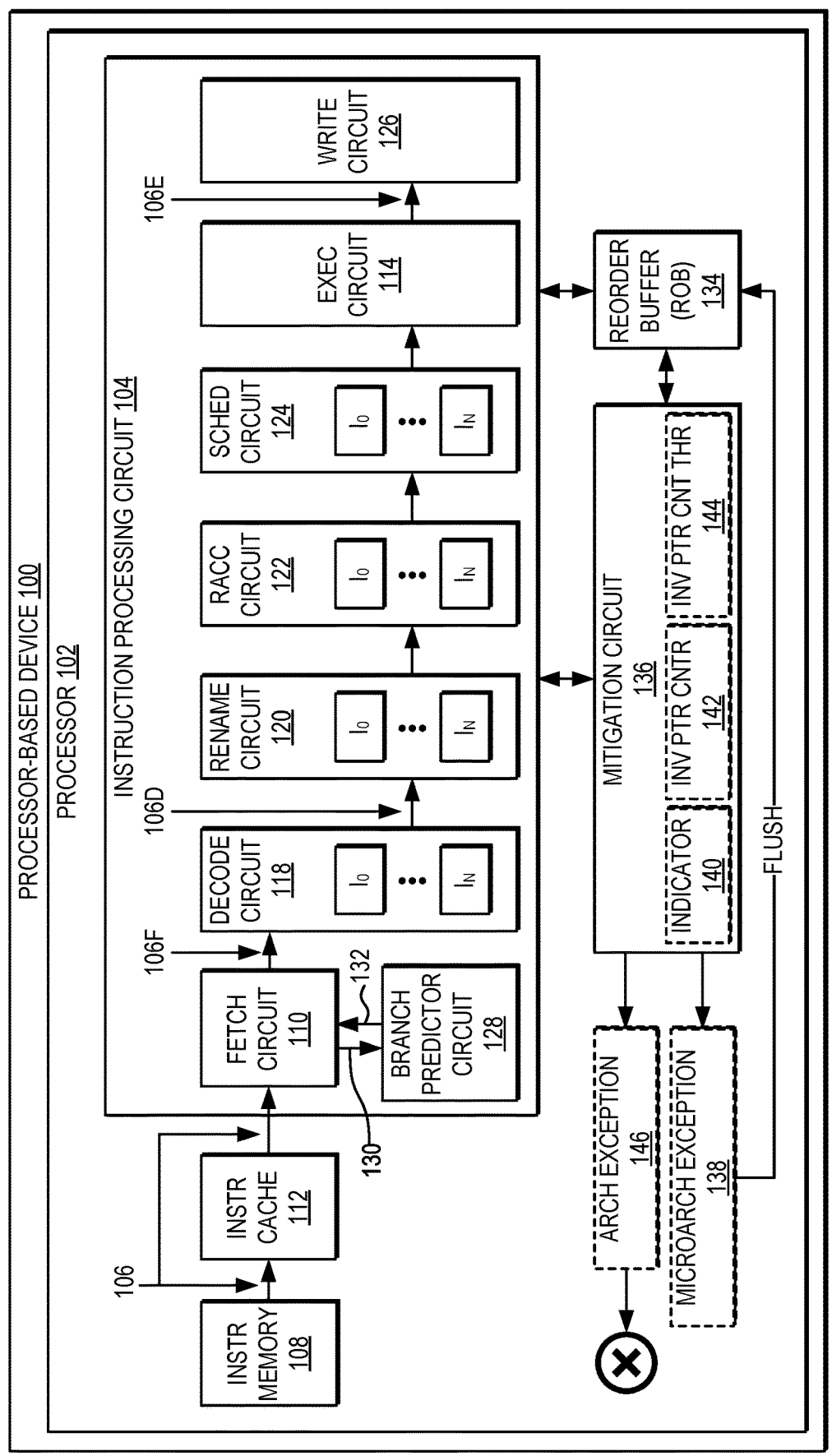
FIG. 1 is a block diagram of an exemplary processor-based device configured to mitigate Pointer Authentication Code (PAC) attacks, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include mitigating Pointer Authentication Code (PAC) attacks in processor-based devices. Related apparatus, methods, and computer-readable media are also disclosed. In this regard, in some exemplary aspects disclosed herein, a processor of a processor-based device (e.g., using a mitigation circuit) determines that a pointer authentication instruction to authenticate a pointer is being executed speculatively. Upon speculatively executing the pointer authentication instruction and determining that the pointer is not valid, the processor performs a mitigation action. As used herein, a "pointer authentication instruction" refers to explicit authentication instructions, such as the ARM instruction AUT, and/or to instructions that comprise a combination of an authentication micro-operation and another micro-operation such as a load micro-operation or a branch micro-operation, as non-limiting examples. The term "PAC attack" and "PACMAN attack" are used herein to refer to attempts to use speculative execution of a pointer authentication instruction to attempt to verify a pointer signature and subsequently use microarchitectural side channels to leak the results of the attempted signature verification.

In some exemplary aspects, the mitigation action includes modifying the signature of the pointer to indicate that the pointer is valid (even though the pointer is in fact not valid), and also raising a microarchitectural exception to trigger a pipeline flush. This process would prevent any information regarding the true validity of the pointer from causing microarchitectural side-effects that could be detected by an attacker. According to some aspects, the pipeline flush may be triggered immediately, while some aspects may provide that the pipeline flush is triggered when the pointer authentication instruction is ready for retirement. In some aspects, the pipeline flush may flush only instructions younger than the pointer authentication instruction, in which case the processor would provide a mechanism for re-executing the pointer authentication instruction to obtain the true result regarding the validity of the pointer. Some aspects may provide that the pointer authentication instruction itself is also flushed. In such aspects, an indicator associated with the pointer authentication instruction is set so that the processor can subsequently determine when a subsequent iteration of the pointer authentication instruction is no longer speculative. When the subsequent iteration of the pointer authentication instruction is determined to no longer be speculative, the processor performs pointer authentication in conventional fashion by modifying the signature of the pointer to trigger an invalid address architectural exception if the signature of the pointer indicates that the pointer is not valid.

According to some aspects, the mitigation action performed by the processor may comprise modifying the signature of the pointer to indicate that the pointer is not valid, and incrementing a value of an invalid pointer counter. The processor in such aspects may then determine whether the value of the invalid pointer counter exceeds an invalid pointer count threshold. If so, the processor raises an architectural exception to indicate a possible attack.

In this regard, FIG. 1 is a diagram of an exemplary processor-based device 100 that includes a processor 102. The processor 102 (also referred to herein as a "processor core" or a "central processing unit (CPU) core") may be an in-order or an out-of-order processor (OoP), and/or may be one of multiple processors 102 provided by the processor-based device 100. The processor 102 of FIG. 1 provides an instruction processing circuit 104 that includes one or more instruction pipelines $I_0$-$I_N$ for processing instructions 106 fetched from an instruction memory (captioned "INSTR MEMORY" in FIG. 1) 108 by a fetch circuit 110 for execution. The instruction memory 108 may be provided at or as part of a system memory in the processor-based device 100, as a non-limiting example. An instruction cache (captioned "INSTR CACHE" in FIG. 1) 112 is also provided in the processor 102 of FIG. 1 to cache the instructions 106 fetched from the instruction memory 108 to reduce latency in the fetch circuit 110.

In the example of FIG. 1, the fetch circuit 110 is configured to provide the instructions 106 as fetched instructions 106F into the one or more instruction pipelines $I_0$-$I_N$ in the instruction processing circuit 104 to be pre-processed, before the fetched instructions 106F reach an execution circuit (captioned "EXEC CIRCUIT" in FIG. 1) 114 to be executed. To increase throughput prior to execution of the fetched instructions 106F by the execution circuit 114, the instruction pipelines $I_0$-$I_N$ are provided across different processing circuits or stages of the instruction processing circuit 104 to pre-process and process the fetched instructions 106F in a series of steps that can be performed concurrently.

The instruction processing circuit 104 of FIG. 1 also includes a decode circuit 118 that is configured to decode the fetched instructions 106F fetched by the fetch circuit 110 into decoded instructions 106D to determine the instruction type and actions required, which may determine in which instruction pipeline $I_0$-$I_N$ the decoded instructions 106D should be placed. In the example of FIG. 1, the decoded instructions 106D are placed in one or more of the instruction pipelines $I_0$-$I_N$ and are next provided to a rename circuit 120 in the instruction processing circuit 104. The rename circuit 120 is configured to determine if any register names in the decoded instructions 106D should be renamed to decouple any register dependencies that would prevent parallel or out-of-order processing.

The instruction processing circuit 104 in the processor 102 in FIG. 1 also includes a register access circuit (captioned "RACC CIRCUIT" in FIG. 1) 122. The register access circuit 122 is configured to access a physical register in a physical register file (PRF) (not shown) based on a mapping entry mapped to a logical register in a register mapping table (RMT) (not shown) of a source register operand of a decoded instruction 106D to retrieve a produced value from an executed instruction 106E in the execution circuit 114. The register access circuit 122 is also configured to provide the retrieved produced value from an executed instruction 106E as the source register operand of a decoded instruction 106D to be executed.

The instruction processing circuit 104 additionally includes a scheduler circuit (captioned "SCHED CIRCUIT" in FIG. 1) 124 in the instruction pipeline $I_0$-$I_N$. The scheduler circuit 124 configured to store decoded instructions 106D in reservation entries (not shown) until all source register operands for the decoded instruction 106D are available. The scheduler circuit 124 then issues decoded instructions 106D that are ready to be executed to the execution circuit 114. A write circuit 126 is also provided in the instruction processing circuit 104 to write back or commit produced values from executed instructions 106E to local memory, cache memory, or system memory.

With continuing reference to FIG. 1, the instruction processing circuit 104 further includes a branch predictor circuit 128 that is configured to speculatively predict the outcome of a fetched branch instruction that controls whether instructions corresponding to a taken path or a not-taken path in the instruction control flow path are fetched into the instruction pipelines $I_0$-$I_N$ for execution. The fetched branch instruction may be a branch instruction 130 that includes a condition to be resolved by the instruction processing circuit 104 to determine which instruction control flow path should be taken. By using a speculatively predicted execution path, the outcome of the branch instruction 130 does not have to be resolved in execution by the execution circuit 114 before the instruction processing circuit 104 can continue processing fetched instructions 106F. The prediction made by the branch predictor circuit 128 can be provided as a branch prediction 132 to the fetch circuit 110 to be used to determine the next instructions 106 to fetch as the fetched instructions 106F.

The instruction processing circuit 104 of FIG. 1 is communicatively coupled to a reorder buffer (ROB) 134 that enables out-of-order execution of the fetched instructions 106F. The ROB 134 contains ROB entries (not shown) that are allocated to each instruction 106 that is being processed by the instruction processing circuit 104, but that has not yet been committed. Each ROB is allocated sequentially in program order to the instructions 106, and a ROB index that identifies the position of each ROB entry in the ROB 134 for each instruction 106 is reported back to the instruction processing circuit 104 when the ROB entry is initially allocated. The ROB 134 also includes a read pointer (not shown) that points to the ROB index of the ROB entry from which information about the oldest uncommitted instruction 106 is read when it is committed, and a write pointer (not shown) that indicates the ROB index of the last ROB entry to which information is written about the youngest uncommitted instruction 106.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 may include elements in addition to those illustrated in FIG. 1, and/or may include more or fewer of the elements illustrated in FIG. 1. For example, the processor-based device 100 may further include one or more CPUs, processor cores, caches, controllers, communications buses, and/or persistent storage devices, which are omitted from FIG. 1 for the sake of clarity.

As noted above, processor-based devices such as the processor-based device 100 of FIG. 1 may be susceptible to control-flow hijacking attacks, with which an attacker may modify a code pointer stored in memory to alter the program flow of an executing process. To defend against such attacks, the processor-based device 100 implements an instruction set architecture (ISA) that provides pointer signing instructions and pointer authentication instructions (not shown), the operation of which are discussed below in greater detail with respect to FIG. 2. Despite the use of such pointer signing and authentication instructions, though, conventional processor-based devices may be susceptible to a PAC attack (or "PACMAN attack") that could enable an attacker to brute-force a pointer's PAC by using a speculative execution path to attempt to verify a PAC, and subsequently using microarchitectural side channels to leak the results of the attempted PAC verification. The use of speculative execution paths as part of a PAC attack is discussed in greater detail below with respect to FIG. 3.

Accordingly, to mitigate against PAC attacks, the processor 102 of the processor-based device 100 provides a mitigation circuit 136 that modifies the manner in which pointer authentication instructions are executed. It is to be understood that, while the mitigation circuit 136 is illustrated as a separate element of the processor 102, the mitigation circuit 136 in some aspects may be integrated into one or more other elements of the processor 102, such as the instruction processing circuit 104. In exemplary operation, the processor 102 determines, using the mitigation circuit 136, that a pointer authentication instruction to authenticate a pointer is being executed speculatively. This may be accomplished, e.g., by the mitigation circuit 136 communicating with elements of the instruction processing circuit 104, as non-limiting examples. In response to determining that the pointer authentication instruction is being executed speculatively, the mitigation circuit 136 determines that the pointer is not valid based on a signature of the pointer. Upon determining that the pointer is not valid, the mitigation circuit 136 performs a mitigation action.

In some exemplary aspects, the mitigation action includes the mitigation circuit 136 modifying the signature of the pointer to indicate that the pointer is valid (i.e., even though the pointer is in fact not valid), and also raising an microarchitectural exception (captioned as "MICROARCH EXCEPTION") 138 to trigger a pipeline flush. The pipeline flush ensure that the pointer authentication instruction is not retired with the architecturally non-compliant result (i.e., indicating that the pointer is valid when it is not). The microarchitectural exception 138 is an exception implemented by the ISA underlying the processor 102 in a manner not visible to software, and may comprise, for example, a signal sent to the ROB 134 by the mitigation circuit 136. By not flagging the pointer as invalid (and thereby causing an attacker's brute-force guesses as to the pointer signature to always return the same result whether the guess is correct or incorrect), the mitigation circuit 136 can prevent any leaks regarding the true validity of the pointer via microarchitectural side channels. Some aspects may provide that the pipeline flush is be triggered immediately, while in some aspects the pipeline flush is triggered when the pointer authentication instruction is ready for retirement.

In some aspects, the processor 102 may hold the pointer authentication instruction in an instruction scheduler (not shown) until the pointer authentication instruction retires, at which point the processor 102 re-executes the pointer authentication instruction when it reaches the head of the ROB 134. Some aspects may provide that the processor 102 may initiate a new micro-code sequence to perform GPR correction when the pointer authentication instruction is at the head of the ROB 134.

Some aspects may provide that the pointer authentication instruction itself is also flushed, in which case an indicator 140 associated with the pointer authentication instruction is set (e.g., by storing an address or identifier of the pointer authentication instruction, as non-limiting examples). Using the indicator 140, the mitigation circuit 136 can determine when a subsequent iteration of the pointer authentication instruction is no longer speculative (e.g., by checking the value of the indicator 140 when the pointer authentication instruction is encountered again). When the subsequent iteration of the pointer authentication instruction is determined to no longer be speculative, the mitigation circuit 136 performs pointer authentication in conventional fashion by modifying the signature of the pointer to trigger an invalid address architectural exception if the signature of the pointer indicates that the pointer is not valid. In some aspects, the processor 102 may determine that the subsequent iteration of the pointer authentication instruction is no longer speculative without the use of an indicator such as the indicator 140 by, e.g., determining that the subsequent iteration of the pointer authentication instruction is the oldest instruction awaiting execution by the processor 102.

It is noted that a PAC attack may require a large number of repeated failed attempts before successfully identifying a valid signature that can be used to tamper with a pointer. Accordingly, some exemplary aspects may provide that the mitigation action performed by the mitigation circuit 136 may comprise modifying the signature of the pointer to indicate that the pointer is not valid (i.e., in conventional fashion), and incrementing a value of an invalid pointer counter (captioned as "INV PTR CNTR" in FIG. 1) 142. The mitigation circuit 136 in such aspects then determines whether the value of the invalid pointer counter 142 exceeds an invalid pointer count threshold (captioned as "INV PTR CNTR THR" in FIG. 1) 144. If so, the mitigation circuit 136 raises an architectural exception (captioned as "ARCH EXCEPTION" in FIG. 1) 146 (i.e., a software-visible exception) to indicate a possible attack. In this manner, the PAC attack may be detected before a valid signature can be identified by the attacker.

Figure 2:
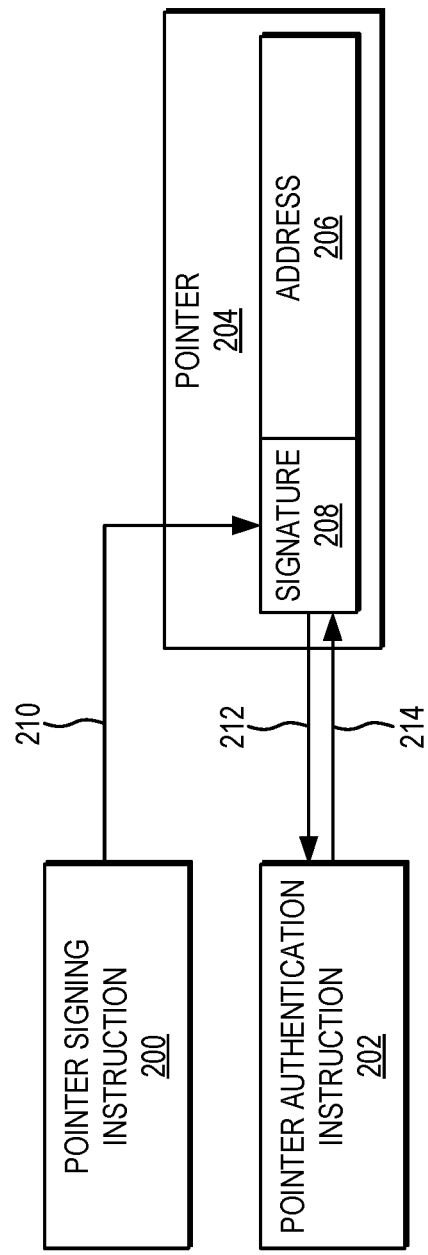
FIG. 2 is a block diagram illustrating the structure of a conventional pointer with signature, and operations for signing and authenticating the pointer.

FIG. 2 is a block diagram that illustrates operations for signing and authenticating a pointer using a pointer signing instruction 200 and a pointer authentication instruction 202, respectively, that are provided by an ISA (such as ARM) that supports pointer authentication. In FIG. 2, a pointer 204 comprises an address 206 that identifies a location in memory that represents, e.g., a target address for a branch instruction, or a location at which data is stored in memory. To prevent unauthorized modification of the pointer 204, an executing process can first execute the pointer signing instruction 200 to sign the pointer 204. Upon execution of the pointer signing instruction 200, a cryptographic hash of the pointer 204 is generated and used as a signature 208 (also referred to as a Pointer Authentication Code, or PAC) for the pointer 204. As indicated by arrow 210 of FIG. 2, the signature 208 is stored within the pointer 204 using bits that are conventionally unused. In some exemplary aspects, the signature 208 may be calculated based on the address 206 of the pointer 204 and a context value (not shown) that consists of a key and a program-specified salt.

The pointer 204 may be subsequently validated by the executing process by executing the pointer authentication instruction 202, as indicated by arrow 212. When the pointer authentication instruction 202 is executed, a recomputed signature (not shown) is generated for the pointer 204 compared against the signature 208 stored in the pointer 204. If the signature 208 matches the recomputed signature, the bits storing the signature 208 are cleared (i.e., by setting them to a value of zero (0)) and the pointer 204 can be used in conventional fashion. However, if the signature 208 does not match the recomputed signature, some bits within the signature 208 are set to cause any de-referencing of the pointer 204 (e.g., an attempt to access data stored at a memory address stored in the pointer 204) to trigger an invalid address architectural exception. Updating of the signature 208 by execution of the pointer authentication instruction 202 is indicated by arrow 214.

Figure 3:
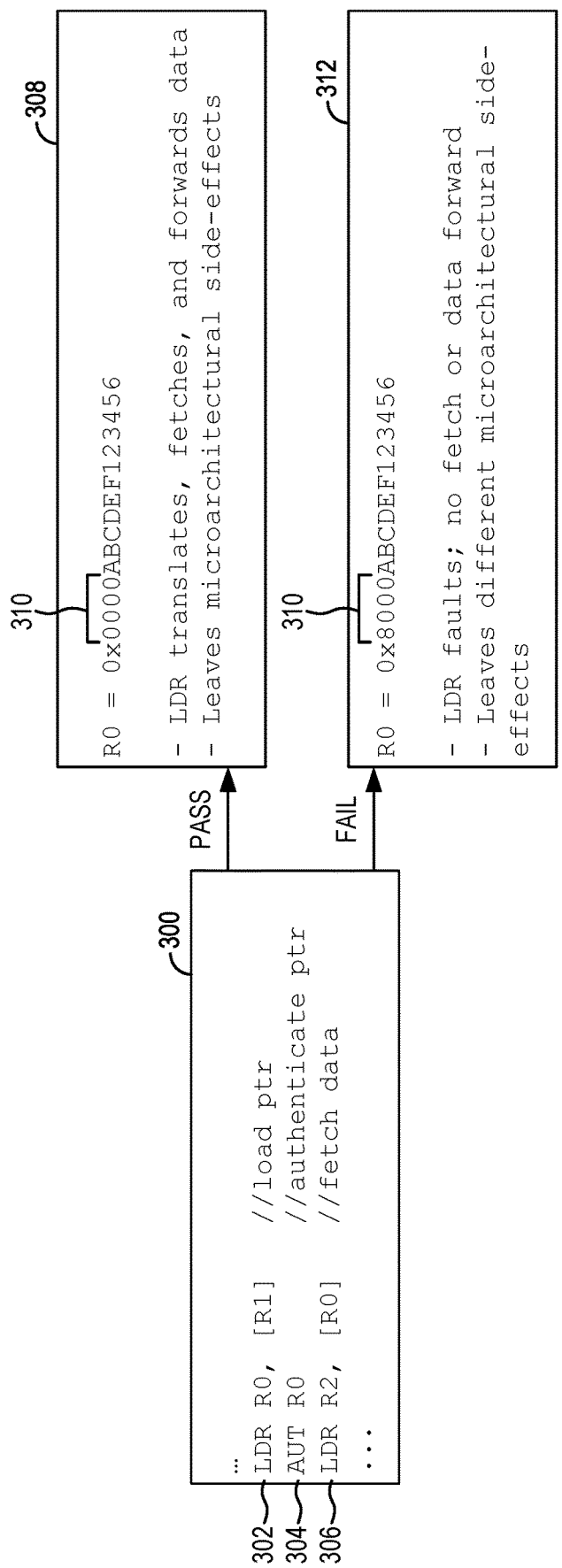
FIG. 3 is a diagram illustrating different execution paths for successful and failed pointer authentications.

FIG. 3 is a diagram illustrating different execution paths for successful and failed pointer authentications, which may be carried out speculatively during a PAC attack. In FIG. 3, a code excerpt 300 includes a load register (LDR) instruction 302 that loads a potentially corrupted pointer from a location specified by a register R1 into a register R0; a pointer authentication (AUT) instruction 304 that attempts to validate the pointer stored in the register R0; and an LDR instruction 306 that loads a value from a location specified by the pointer in the register R0 into a register R2. Block 308 shows the outcome if the pointer in the register R0 is successfully validated (as indicated by the arrow captioned PASS). In this case, bits storing a signature 310 of the pointer stored in the register R0 is cleared (i.e., by setting the signature 310 to a value of 0000 as seen in block 308), and the LDR instruction 306 translates, fetches, and stores data at the location indicated by the pointer. These operations leave microarchitectural side-effects, such as changes made to contents of caches, translation lookaside buffers (TLBs), functional units, and network-on-chips. In block 312, the outcome of a failed validation of the pointer in the register R0 is shown (as indicated by the arrow captioned FAIL). In this case, specific bits storing the signature 310 are modified (i.e., in this example, by setting the signature 310 to a value of 8000 as seen in block 312) to cause a subsequent de-referencing of the pointer stored in the register R0 to trigger an invalid address architectural exception. In addition, other microarchitectural side-effects different from those that result from the successful authentication of block 308 may be left.

The PAC attack makes use of speculative execution to attempt to brute-force a pointer's signature. As noted above, the use of pointer authentication instructions such as the pointer authentication instruction 202 of FIG. 2 means that the attacker must identify a valid signature (e.g., the signature 208 of FIG. 2) in order to modify a pointer such as the pointer 204 of FIG. 2. Moreover, as discussed above, the different outcomes illustrated in blocks 308 and 312 of FIG. 3 translate into different microarchitectural side effects (e.g., changes made to contents of caches, translation lookaside buffers (TLBs), functional units, and network-on-chips that remain even if a speculative execution path is squashed) that may be observed by the attacker. Thus, the PAC attack causes execution of the pointer authentication instruction to occur on a speculative execution path, such as an execution path resulting from a mispredicted branch, to prevent the invalid address architectural exception that results from a failed pointer authentication from causing the attack to be recognized. The attacker can attempt authentication (and observe the microarchitectural side effects that result) repeatedly until a valid signature is identified, at which point the attacker can craft a malicious pointer with a valid signature.

Figure 4:
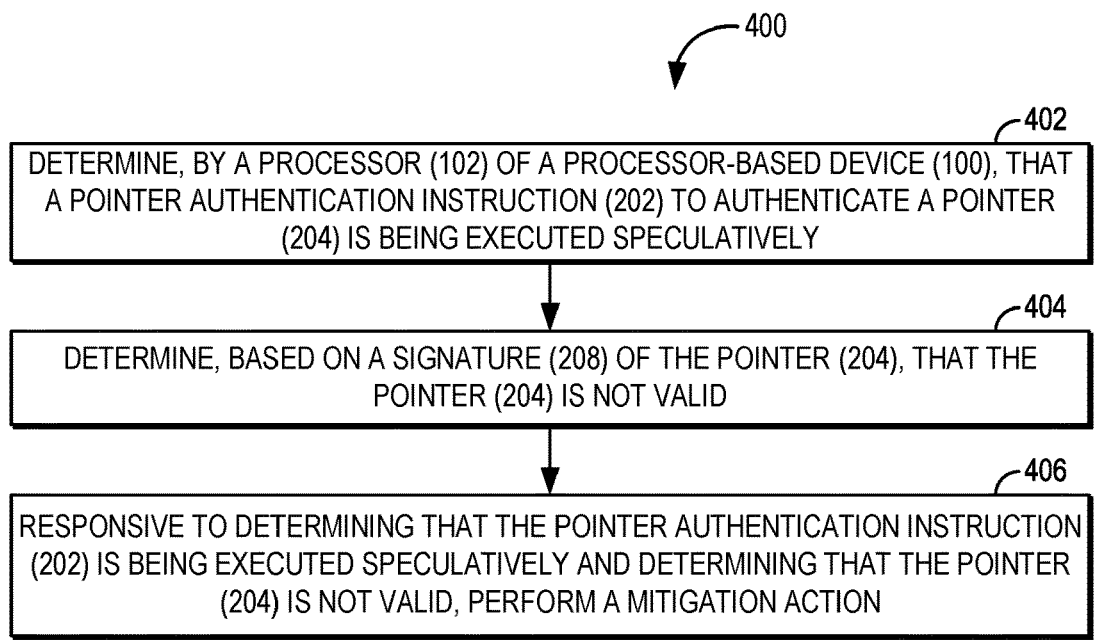
FIG. 4 is a flowchart illustrating exemplary operations for mitigating PAC attacks, according to some aspects.

Accordingly, to illustrate exemplary operations by the processor-based device 100 of FIG. 1 for mitigating PAC attacks, FIG. 4 provides a flowchart illustrating exemplary operations 400. For the sake of clarity, elements of FIGS. 1 and 2 are referenced in describing FIG. 4. The exemplary operations 400 begin in FIG. 4 with a processor (e.g., the processor 102 of FIG. 1) determining that a pointer authentication instruction (e.g., the pointer authentication instruction 202 of FIG. 2) to authenticate a pointer (e.g., the pointer 204 of FIG. 2) is being executed speculatively (block 402). The processor 102 next determines, based on a signature (e.g., the signature 208 of FIG. 2) of the pointer 204, that the pointer 204 is not valid (block 404). The processor 102 then, responsive to determining that the pointer authentication instruction 202 is being executed speculatively and determining that the pointer 204 is not valid, performs a mitigation action (block 406). It is to be understood that some of the exemplary operations 400 may be performed in an order other than that illustrated in FIG. 4.

Figure 5A:
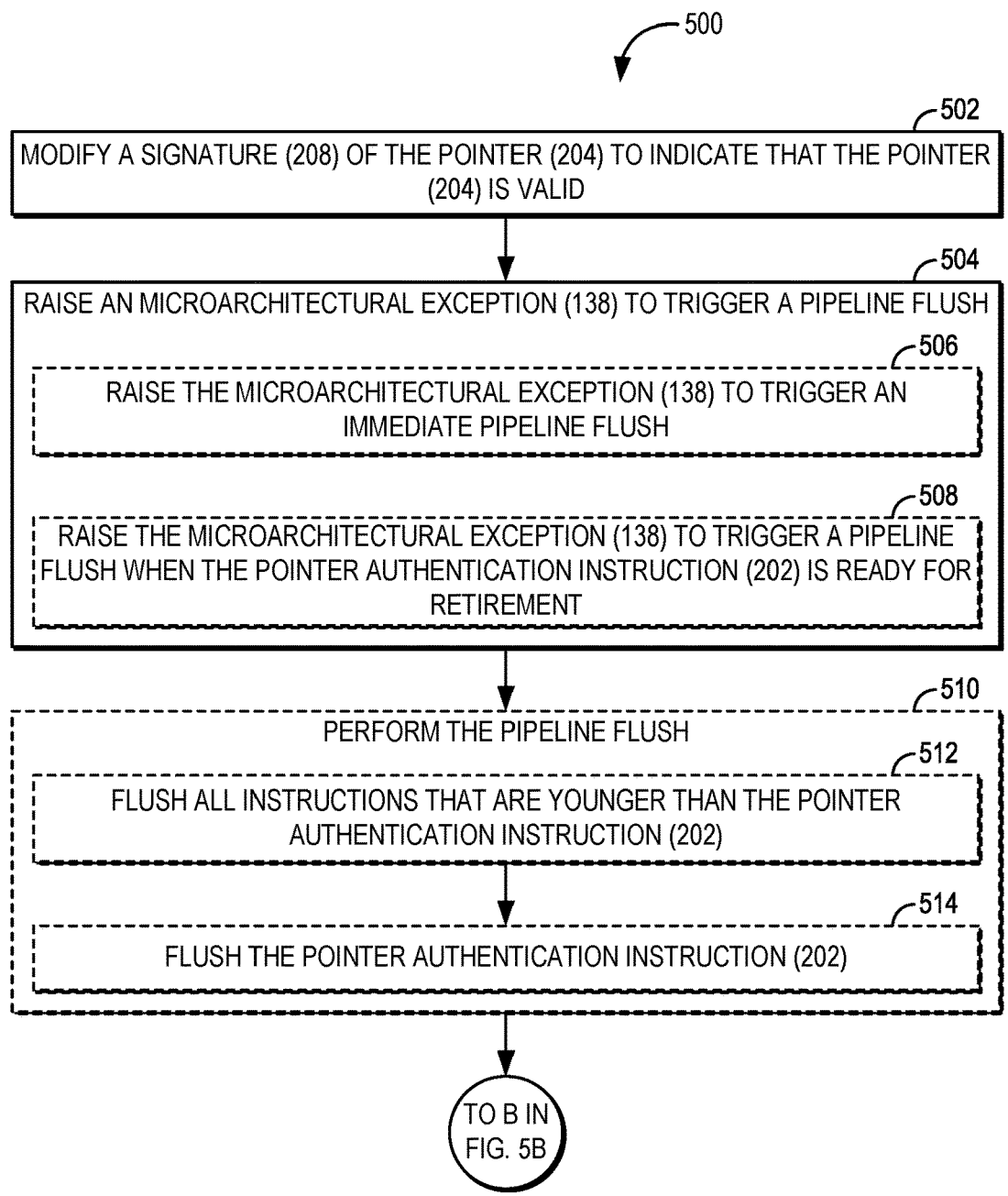
FIGS. 5A and 5B are flowcharts illustrating additional exemplary operations for mitigating PAC attacks by raising a microarchitectural exception to trigger a pipeline flush, according to some aspects.
Figure 5B:
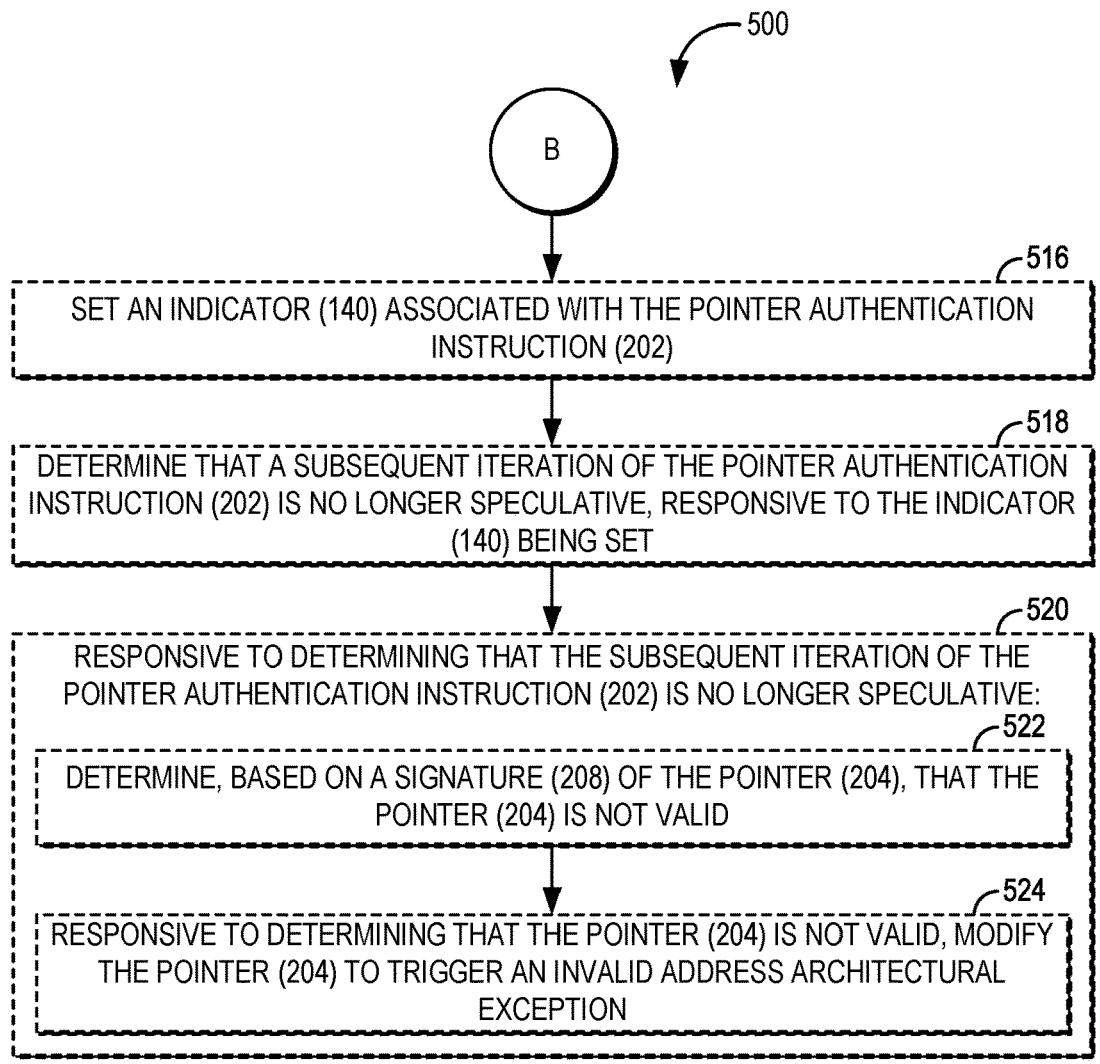

In some aspects, the operations of block 406 of FIG. 4 for performing a mitigation action may include the processor 102 raising a microarchitectural exception to trigger a pipeline flush. In this regard, FIGS. 5A and 5B provide flowcharts illustrating exemplary operations 500 for performing the mitigation action of block 406 of FIG. 4 according to such aspects. Elements of FIGS. 1 and 2 are referenced in describing FIGS. 5A and 5B for the sake of clarity. It is to be understood that some of the exemplary operations 500 may be performed in an order other than that illustrated in FIGS. 5A and 5B, and/or may be omitted.

In FIG. 5A, the exemplary operations 500 begin with the processor 102 modifying the signature 208 of the pointer 204 to indicate that the pointer 204 is valid (block 502). The processor 102 then raises an microarchitectural exception to trigger a pipeline flush, such as the microarchitectural exception 138 of FIG. 1 (block 504). Some aspects may provide that the operations of block 504 for raising the microarchitectural exception 138 to trigger the pipeline flush may comprise raising the microarchitectural exception 138 to trigger an immediate pipeline flush (block 506). According to some aspects, the operations of block 504 for raising the microarchitectural exception 138 to trigger the pipeline flush may comprise raising the microarchitectural exception 138 to trigger a pipeline flush when the pointer authentication instruction 202 is ready for retirement (block 508).

In some aspects, the processor 102 subsequently performs the pipeline flush (block 510). Some aspects may provide that the operations of block 510 for performing the pipeline flush may comprise flushing all instructions that are younger than the pointer authentication instruction 202 (block 512). As discussed above in greater detail, such aspects may provide a mechanism for the pointer authentication instruction 202 to be re-executed to recover the correct result from the attempt to authorize the pointer 204. According to some aspects, the operations of block 510 for performing the pipeline flush may further comprise flushing the pointer authentication instruction 202 (block 514). The exemplary operations 500 in such aspects may continue at block 516 of FIG. 5B.

Referring now to FIG. 5B, after the pointer authentication instruction 202 is flushed, the exemplary operations 500 continue with the processor 102 setting an indicator (e.g., the indicator 140 of FIG. 1) associated with the pointer authentication instruction 202 (block 516). Subsequently, the processor 102 determines that a subsequent iteration of the pointer authentication instruction 202 is no longer speculative, responsive to the indicator 140 being set (block 518).

Upon determining that the subsequent iteration of the pointer authentication instruction 202 is no longer speculative, the processor 102 performs a series of instructions (block 520). The processor 102 determines, based on the signature 208 of the pointer 204, that the pointer 204 is not valid (block 522). In response to determining that the pointer 204 is not valid, the processor 102 modifies the pointer 204 to trigger an invalid address architectural exception (i.e., in conventional fashion) (block 524).

Figure 6:
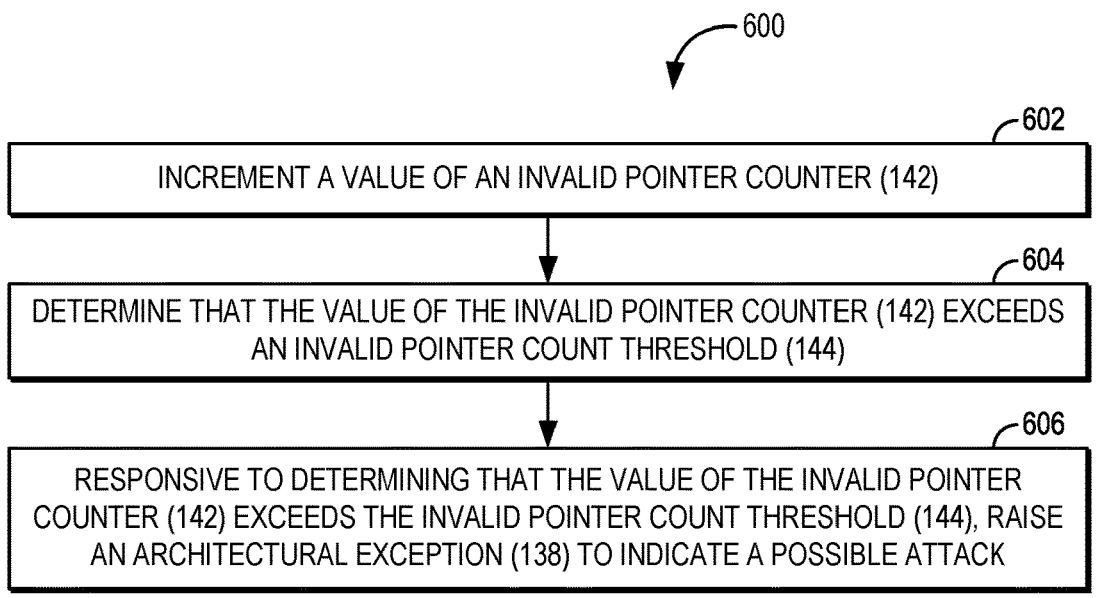
FIG. 6 is a flowchart illustrating additional exemplary operations for mitigating PAC attacks by tracking occurrences of invalid pointers, and raising an architectural exception if a threshold is exceeded, according to some aspects.

Some aspects may provide that the operations of block 406 of FIG. 4 for performing a mitigation action comprise tracking occurrences of invalid pointers and raising an architectural exception if a threshold is exceeded. In this regard, FIG. 6 provides a flowchart illustrating exemplary operations 600 for performing the mitigation action of block 406 of FIG. 4 according to such aspects. For the sake of clarity, elements of FIGS. 1 and 2 are referenced in describing FIG. 6. It is to be understood that some of the exemplary operations 600 may be performed in an order other than that illustrated in FIG. 6, and/or may be omitted.

The exemplary operations 600 begin in FIG. 6 with the processor 102 incrementing a value of an invalid pointer counter, such as the invalid pointer counter 142 of FIG. 1 (block 602). The processor 102 then determines that the value of the invalid pointer counter 142 exceeds an invalid pointer count threshold, such as the invalid pointer count threshold 144 of FIG. 1 (block 604). Responsive to determining that the value of the invalid pointer counter 142 exceeds the invalid pointer count threshold 144, the processor 102 raises an architectural exception (e.g., the architectural exception 146 of FIG. 1) to indicate a possible attack (block 606).

Mitigating PAC attacks according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
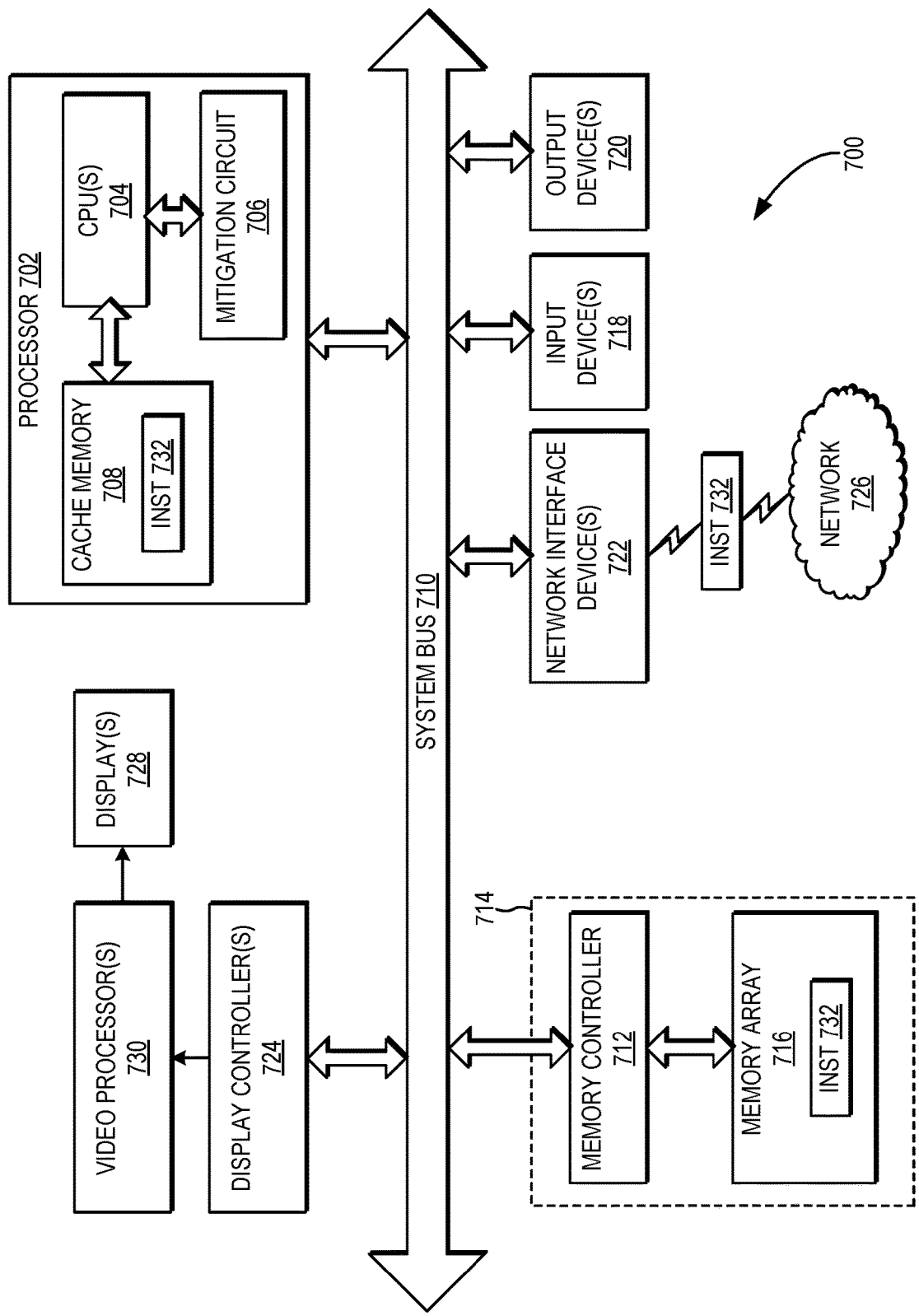
FIG. 7 is a block diagram of an exemplary processor-based device that includes but is not limited to the processor-based device of FIG. 1.

In this regard, FIG. 7 illustrates an example of a processor-based device 700 that may comprise the processor-based device 100 illustrated in FIG. 1. In this example, the processor-based device 700 includes a processor 702 that may comprise the processor 102 of FIG. 1, and that includes one or more central processing units (captioned as "CPUs" in FIG. 7) 704, which may also be referred to as CPU cores or processor cores. The processor 702 of FIG. 7 further comprises a mitigation circuit 706 that corresponds in functionality to the mitigation circuit 136 of FIG. 1. The processor 702 may have cache memory 708 coupled to the processor 702 for rapid access to temporarily stored data. The processor 702 is coupled to a system bus 710 and can intercouple master and slave devices included in the processor-based device 700. As is well known, the processor 702 communicates with these other devices by exchanging address, control, and data information over the system bus 710. For example, the processor 702 can communicate bus transaction requests to a memory controller 712, as an example of a slave device. Although not illustrated in FIG. 7, multiple system buses 710 could be provided, wherein each system bus 710 constitutes a different fabric.

Other master and slave devices can be connected to the system bus 710. As illustrated in FIG. 7, these devices can include a memory system 714 that includes the memory controller 712 and a memory array(s) 716, one or more input devices 718, one or more output devices 720, one or more network interface devices 722, and one or more display controllers 724, as examples. The input device(s) 718 can include any type of input device, including but not limited to input keys, switches, voice processors, etc. The output device(s) 720 can include any type of output device, including, but not limited to, audio, video, other visual indicators, etc. The network interface device(s) 722 can be any device configured to allow exchange of data to and from a network 726. The network 726 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 722 can be configured to support any type of communications protocol desired.

The processor 702 may also be configured to access the display controller(s) 724 over the system bus 710 to control information sent to one or more displays 728. The display controller(s) 724 sends information to the display(s) 728 to be displayed via one or more video processors 730, which process the information to be displayed into a format suitable for the display(s) 728. The display(s) 728 can include any type of display, including but not limited to a cathode ray tube (CRT), a liquid crystal display (LCD), a plasma display, etc.

The processor-based device 700 in FIG. 7 may include a set of instructions (captioned as "INST" in FIG. 7) 732 that may be executed by the processor 702 for any application desired according to the instructions. The instructions 732 may be stored in the memory array 716, the processor 702, and/or the cache memory 708, each of which may comprise an example of a non-transitory computer-readable medium. The instructions 732 may also reside, completely or at least partially, within the memory array 716 and/or within the processor 702 during their execution. The instructions 732 may further be transmitted or received over the network 726, such that the network 726 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the one or more sets of instructions 732. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
   a processor configured to:
     determine that a pointer authentication instruction to authenticate a pointer is being executed speculatively;
     determine, based on a signature of the pointer, that the pointer is not valid; and
     responsive to determining that the pointer authentication instruction to authenticate the pointer is being executed speculatively and determining that the pointer is not valid, perform a mitigation action.

2. The processor-based device of clause 1, wherein the processor is configured to perform the mitigation action by being configured to:
   modify the signature of the pointer to indicate that the pointer is valid; and
   raise a microarchitectural exception to trigger a pipeline flush.

3. The processor-based device of clause 2, wherein the processor is configured to raise the microarchitectural exception to trigger a pipeline flush by being configured to raise the microarchitectural exception to trigger an immediate pipeline flush.

4. The processor-based device of any one of clauses 2-3, wherein the processor is configured to raise the microarchitectural exception to trigger a pipeline flush by being configured to raise the microarchitectural exception to trigger a pipeline flush when the pointer authentication instruction is ready for retirement.

5. The processor-based device of any one of clauses 2-4, wherein the processor is further configured to perform the pipeline flush.

6. The processor-based device of clause 5, wherein the processor is configured to perform the pipeline flush by being configured to flush all instructions that are younger than the pointer authentication instruction.

7. The processor-based device of any one of clauses 5-6, wherein the processor is further configured to perform the pipeline flush by being configured to flush the pointer authentication instruction.

8. The processor-based device of clause 7, wherein the processor is further configured to:
   set an indicator associated with the pointer authentication instruction;
   determine that a subsequent iteration of the pointer authentication instruction is no longer speculative, responsive to the indicator being set; and
   responsive to determining that the subsequent iteration of the pointer authentication instruction is no longer speculative:
     determine, based on the signature of the pointer, that the pointer is not valid; and
     responsive to determining that the pointer is not valid, modify the signature of the pointer to trigger an invalid address architectural exception.

9. The processor-based device of any one of clauses 1-8, wherein the processor is configured to perform the mitigation action by being configured to:
increment a value of an invalid pointer counter;
determine that the value of the invalid pointer counter exceeds an invalid pointer count threshold; and
responsive to determining that the value of the invalid pointer counter exceeds the invalid pointer count threshold, raise an architectural exception to indicate a possible attack.

10. The processor-based device any one of clauses 1-9, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A processor-based device, comprising:
means for determining that a pointer authentication instruction to authenticate a pointer is being executed speculatively;
means for determining, based on a signature of the pointer, that the pointer is not valid; and
means for performing a mitigation action, responsive to determining that the pointer authentication instruction is being executed speculatively and determining that the pointer is not valid.

12. A method for mitigating of Pointer Authentication Code (PAC) attacks in a processor-based device, the method comprising:
determining, by a processor of the processor-based device, that a pointer authentication instruction to authenticate a pointer is being executed speculatively;
determining, based on a signature of the pointer, that the pointer is not valid; and
responsive to determining that the pointer authentication instruction is being executed speculatively and determining that the pointer is not valid, performing a mitigation action.

13. The method of clause 12, wherein performing the mitigation action comprises:
modifying a signature of the pointer to indicate that the pointer is valid; and
raising an microarchitectural exception to trigger a pipeline flush.

14. The method of clause 13, wherein raising the microarchitectural exception to trigger a pipeline flush comprises raising the microarchitectural exception to trigger an immediate pipeline flush.

15. The method of any one of clauses 13-14, wherein raising the microarchitectural exception to trigger a pipeline flush comprises raising the microarchitectural exception to trigger a pipeline flush when the pointer authentication instruction is ready for retirement.

16. The method of any one of clauses 13-15, further comprising performing the pipeline flush.

17. The method of clause 16, wherein performing the pipeline flush comprises flushing all instructions that are younger than the pointer authentication instruction.

18. The method of clause 17, wherein performing the pipeline flush comprises flushing the pointer authentication instruction.

19. The method of clause 18, further comprising:
setting an indicator associated with the pointer authentication instruction;
determining that a subsequent iteration of the pointer authentication instruction is no longer speculative, responsive to the indicator being set; and
responsive to determining that the subsequent iteration of the pointer authentication instruction is no longer speculative:
determining, based on a signature of the pointer, that the pointer is not valid; and
responsive to determining that the pointer is not valid, modifying the signature of the pointer to trigger an invalid address architectural exception.

20. The method of any one of clauses 12-19, wherein performing the mitigation action comprises:
incrementing a value of an invalid pointer counter;
determining that the value of the invalid pointer counter exceeds an invalid pointer count threshold; and
responsive to determining that the value of the invalid pointer counter exceeds the invalid pointer count threshold, raising an architectural exception to indicate a possible attack.

21. A non-transitory computer-readable medium having stored thereon computer-executable instructions which, when executed by a processor, cause the processor to provide location-based prefetching for a first cache memory device by causing the processor to:
determine that a pointer authentication instruction to authenticate a pointer is being executed speculatively;
determine, based on a signature of the pointer, that the pointer is not valid; and
responsive to determining that the pointer authentication instruction is being executed speculatively and determining that the pointer is not valid, perform a mitigation action.

22. The non-transitory computer-readable medium of clause 21, wherein the computer-executable instructions cause the processor to perform the mitigation action by causing the processor to:
modify a signature of the pointer to indicate that the pointer is valid; and
raise an microarchitectural exception to trigger a pipeline flush.

23. The non-transitory computer-readable medium of clause 22, wherein the computer-executable instructions cause the processor to raise the microarchitectural exception to trigger a pipeline flush by causing the processor to raise the microarchitectural exception to trigger an immediate pipeline flush.

24. The non-transitory computer-readable medium of any one of clauses 22-23, wherein the computer-executable instructions cause the processor to raise the microarchitectural exception to trigger a pipeline flush by causing the processor to raise the microarchitectural exception to trigger a pipeline flush when the pointer authentication instruction is ready for retirement.

25. The non-transitory computer-readable medium of any one of clauses 22-24, wherein the computer-executable instructions further cause the processor to perform the pipeline flush.

26. The non-transitory computer-readable medium of clause 25, wherein the computer-executable instructions cause the processor to perform the pipeline flush by causing the processor to flush all instructions that are younger than the pointer authentication instruction.

27. The non-transitory computer-readable medium of clause 26, wherein the computer-executable instructions cause the processor to perform the pipeline flush by causing the processor to flush the pointer authentication instruction.

28. The non-transitory computer-readable medium of clause 27, wherein the computer-executable instructions further cause the processor to:
set an indicator associated with the pointer authentication instruction;
determine that a subsequent iteration of the pointer authentication instruction is no longer speculative, responsive to the indicator being set; and
responsive to determining that the subsequent iteration of the pointer authentication instruction is no longer speculative:
determine, based on a signature of the pointer, that the pointer is not valid; and
responsive to determining that the pointer is not valid, modify the signature of the pointer to trigger an invalid address architectural exception.

29. The non-transitory computer-readable medium of any one of clauses 21-28, wherein the computer-executable instructions cause the processor to perform the mitigation action by causing the processor to:
increment a value of an invalid pointer counter;
determine that the value of the invalid pointer counter exceeds an invalid pointer count threshold; and
responsive to determining that the value of the invalid pointer counter exceeds the invalid pointer count threshold, raise an architectural exception to indicate a possible attack.

What is claimed is:

1. A processor-based device, comprising:
a processor configured to:
determine that a pointer authentication instruction to authenticate a pointer is being executed speculatively;
determine, based on a signature of the pointer, that the pointer is not valid; and
responsive to determining that the pointer authentication instruction to authenticate the pointer is being executed speculatively and determining that the pointer is not valid, perform a mitigation action comprising an action that prevents information regarding validity of the pointer from causing a microarchitectural side effect.

2. The processor-based device of claim 1, wherein the processor is configured to perform the mitigation action by being configured to:
modify the signature of the pointer to indicate that the pointer is valid; and
raise a microarchitectural exception to trigger a pipeline flush.

3. The processor-based device of claim 2, wherein the processor is configured to raise the microarchitectural exception to trigger the pipeline flush by being configured to raise the microarchitectural exception to trigger an immediate pipeline flush.

4. The processor-based device of claim 2, wherein the processor is configured to raise the microarchitectural exception to trigger the pipeline flush by being configured to raise the microarchitectural exception to trigger the pipeline flush when the pointer authentication instruction is ready for retirement.

5. The processor-based device of claim 2, wherein the processor is further configured to perform the pipeline flush.

6. The processor-based device of claim 5, wherein the processor is configured to perform the pipeline flush by being configured to flush all instructions that are younger than the pointer authentication instruction.

7. The processor-based device of claim 6, wherein the processor is further configured to perform the pipeline flush by being configured to flush the pointer authentication instruction.

8. The processor-based device of claim 7, wherein the processor is further configured to:
set an indicator associated with the pointer authentication instruction;
determine that a subsequent iteration of the pointer authentication instruction is no longer speculative, responsive to the indicator being set; and
responsive to determining that the subsequent iteration of the pointer authentication instruction is no longer speculative:
determine, based on the signature of the pointer, that the pointer is not valid; and
responsive to determining that the pointer is not valid, modify the signature of the pointer to trigger an invalid address architectural exception.

9. The processor-based device of claim 1, wherein the processor is configured to perform the mitigation action by being configured to:
increment a value of an invalid pointer counter;
determine that the value of the invalid pointer counter exceeds an invalid pointer count threshold; and
responsive to determining that the value of the invalid pointer counter exceeds the invalid pointer count threshold, raise an architectural exception to indicate a possible attack.

10. The processor-based device claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A processor-based device, comprising:
means for determining that a pointer authentication instruction to authenticate a pointer is being executed speculatively;
means for determining, based on a signature of the pointer, that the pointer is not valid; and means for performing a mitigation action comprising an action that prevents information regarding validity of the pointer from causing a microarchitectural side effect, responsive to determining that the pointer authentication instruction is being executed speculatively and determining that the pointer is not valid.

12. A method for mitigating Pointer Authentication Code (PAC) attacks in a processor-based device, the method comprising:
   determining, by a processor of the processor-based device, that a pointer authentication instruction to authenticate a pointer is being executed speculatively;
   determining, based on a signature of the pointer, that the pointer is not valid; and
   responsive to determining that the pointer authentication instruction is being executed speculatively and determining that the pointer is not valid, performing a mitigation action comprising an action that prevents information regarding validity of the pointer from causing a microarchitectural side effect.

13. The method of claim 12, wherein performing the mitigation action comprises:
   modifying the signature of the pointer to indicate that the pointer is valid; and
   raising a microarchitectural exception to trigger a pipeline flush.

14. The method of claim 13, wherein raising the microarchitectural exception to trigger the pipeline flush comprises raising the microarchitectural exception to trigger an immediate pipeline flush.

15. The method of claim 13, wherein raising the microarchitectural exception to trigger the pipeline flush comprises raising the microarchitectural exception to trigger the pipeline flush when the pointer authentication instruction is ready for retirement.

16. The method of claim 13, further comprising performing the pipeline flush.

17. The method of claim 16, wherein performing the pipeline flush comprises flushing all instructions that are younger than the pointer authentication instruction.

18. The method of claim 17, wherein performing the pipeline flush comprises flushing the pointer authentication instruction.

19. The method of claim 18, further comprising:
   setting an indicator associated with the pointer authentication instruction;
   determining that a subsequent iteration of the pointer authentication instruction is no longer speculative, responsive to the indicator being set; and
   responsive to determining that the subsequent iteration of the pointer authentication instruction is no longer speculative:
      determining, based on the signature of the pointer, that the pointer is not valid; and
      responsive to determining that the pointer is not valid, modifying the signature of the pointer to trigger an invalid address architectural exception.

20. The method of claim 12, wherein performing the mitigation action comprises:
   incrementing a value of an invalid pointer counter;
   determining that the value of the invalid pointer counter exceeds an invalid pointer count threshold; and
   responsive to determining that the value of the invalid pointer counter exceeds the invalid pointer count threshold, raising an architectural exception to indicate a possible attack.

21. A non-transitory computer-readable medium having stored thereon computer-executable instructions which, when executed by a processor, cause the processor to provide location-based prefetching for a first cache memory device by causing the processor to:
   determine that a pointer authentication instruction to authenticate a pointer is being executed speculatively;
   determine, based on a signature of the pointer, that the pointer is not valid; and
   responsive to determining that the pointer authentication instruction is being executed speculatively and determining that the pointer is not valid, perform a mitigation action comprising an action that prevents information regarding validity of the pointer from causing a microarchitectural side effect.

22. The non-transitory computer-readable medium of claim 21, wherein the computer-executable instructions cause the processor to perform the mitigation action by causing the processor to:
   modify the signature of the pointer to indicate that the pointer is valid; and
   raise a microarchitectural exception to trigger a pipeline flush.

23. The non-transitory computer-readable medium of claim 22, wherein the computer-executable instructions cause the processor to raise the microarchitectural exception to trigger the pipeline flush by causing the processor to raise the microarchitectural exception to trigger an immediate pipeline flush.

24. The non-transitory computer-readable medium of claim 22, wherein the computer-executable instructions cause the processor to raise the microarchitectural exception to trigger the pipeline flush by causing the processor to raise the microarchitectural exception to trigger the pipeline flush when the pointer authentication instruction is ready for retirement.

25. The non-transitory computer-readable medium of claim 22, wherein the computer-executable instructions further cause the processor to perform the pipeline flush.

26. The non-transitory computer-readable medium of claim 25, wherein the computer-executable instructions cause the processor to perform the pipeline flush by causing the processor to flush all instructions that are younger than the pointer authentication instruction.

27. The non-transitory computer-readable medium of claim 26, wherein the computer-executable instructions cause the processor to perform the pipeline flush by causing the processor to flush the pointer authentication instruction.

28. The non-transitory computer-readable medium of claim 27, wherein the computer-executable instructions further cause the processor to:
   set an indicator associated with the pointer authentication instruction;
   determine that a subsequent iteration of the pointer authentication instruction is no longer speculative, responsive to the indicator being set; and
   responsive to determining that the subsequent iteration of the pointer authentication instruction is no longer speculative:
      determine, based on the signature of the pointer, that the pointer is not valid; and
      responsive to determining that the pointer is not valid, modify the signature of the pointer to trigger an invalid address architectural exception.

29. The non-transitory computer-readable medium of claim 21, wherein the computer-executable instructions cause the processor to perform the mitigation action by causing the processor to:
increment a value of an invalid pointer counter;
determine that the value of the invalid pointer counter exceeds an invalid pointer count threshold; and
responsive to determining that the value of the invalid pointer counter exceeds the invalid pointer count threshold, raise an architectural exception to indicate a possible attack.

* * * * *